3,082,166
PROCESS FOR THE DRYING OF VOLATILE LIQUIDS
Charles W. Skarstrom, Montvale, N.J., assignor to Esso Research and Engineering Company, a corporation of Delaware
Filed July 8, 1960, Ser. No. 41,589
10 Claims. (Cl. 208—188)

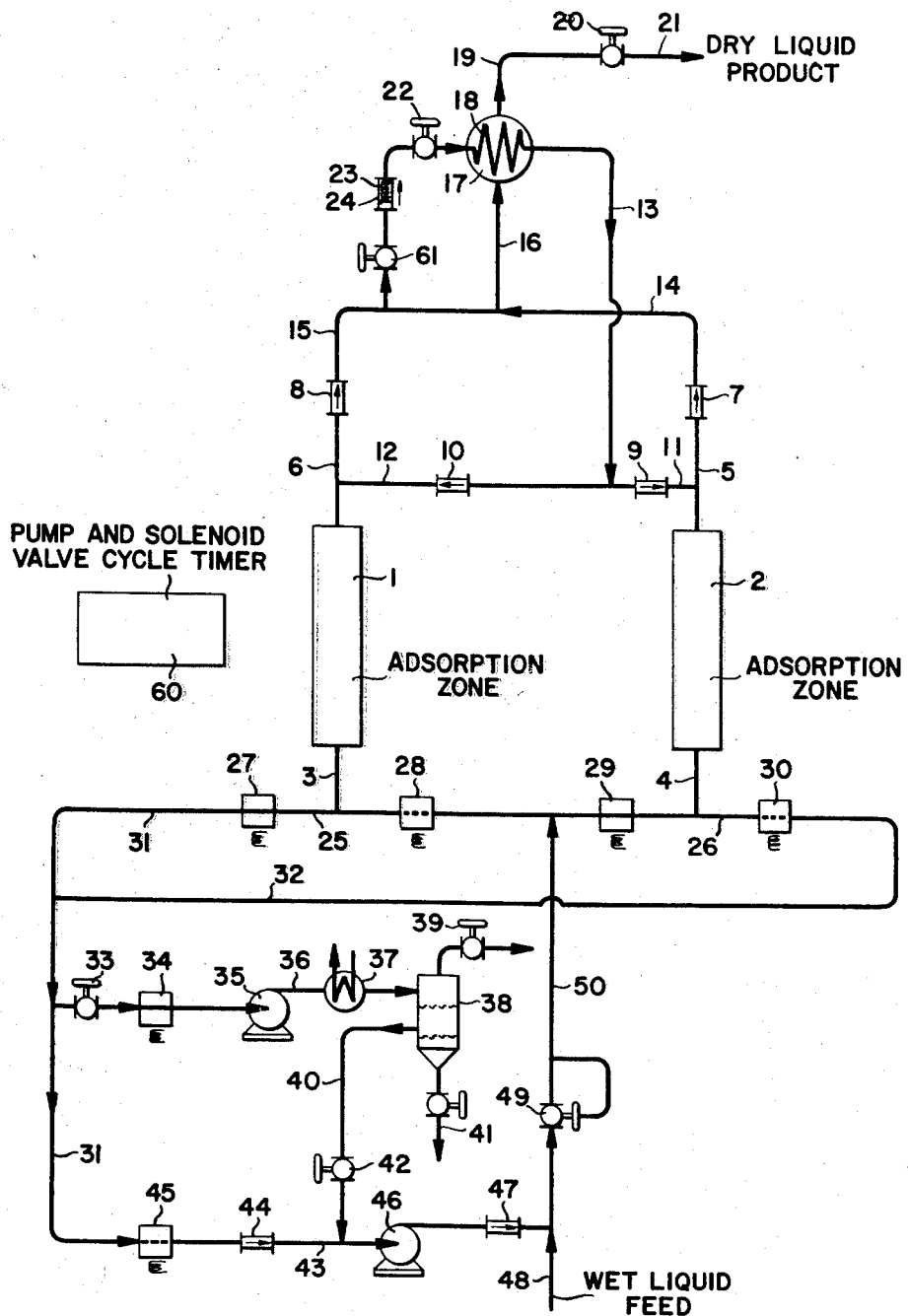

The present invention is concerned with an improved method for the drying of volatile liquids. The invention is particularly concerned with the removal of moisture from hydrophobic hydrocarbon liquids by an improved technique. The invention comprises a continuation-in-part and an improvement and adaptation of the process and apparatus described in copending application, Serial No. 714,780, filed February 12, 1958, now U.S. Patent 2,944,627, entitled "Method and Apparatus for Fracturing Gaseous Mixtures," inventor, Charles W. Skarstrom. In accordance with the preferred adaptation of the present invention, a liquid containing moisture is passed in the liquid phase under relatively high pressure sufficient to maintain the feed in the liquid phase through an adsorption or drying zone. The dry liquid is removed from the adsorption zone and utilized as desired. In accordance with the present invention, a portion of the dry liquid is segregated and passed through pressure reducing means whereby said portion segregated is flashed into the vapor phase. This vapor is then utilized to backflow through a second zone undergoing desorption. At the end of the cycle when the adsorption zone is substantially saturated with moisture, and said zone under desorption is substantially free of moisture, the cycle is reversed and continued as described in the parent application.

In commercial manufacturing operations in very many instances, it is essential that the feed streams undergoing chemical reaction or treatment, be relatively free of moisture. As a matter of fact, in many instances it is essential that the moisture content of these streams be substantially nil. Thus, many operations and processes have been suggested for pretreating feed streams so as to reduce or substantially remove all moisture therefrom. However, in order to secure the desired low concentration of moisture, the operation is relatively expensive, particularly, when treating some feed streams. In accordance with the present invention, the removal of moisture from feed streams to the desired degree is accomplished in an efficient and relatively inexpensive manner.

The process of the present invention is particularly adaptable for removing moisture from hydrocarbon streams undergoing platinum hydroforming; for the removal of moisture from feeds comprising isobutanes and isobutenes; from feed streams for acid alkylation plants, and for drying isobutylene liquid used for the manufacture of rubber and polymer products. A particular advantage of the process of the present invention is that it is possible to obtain a very large effective volume expansion by flashing the liquid to its vapor form. This large volume is capable of regenerating the bed very well by utilizing only a very small fraction of the liquid throughput.

The process of the present invention may be readily understood by reference to the drawing illustrating one embodiment of the same. Referring specifically to the drawing, a wet liquid feed as, for example, a petroleum hydrocarbon feed containing moisture is introduced into the system by means of line 48 at a pressure sufficient to maintain the hydrocarbons in the liquid phase. This feed passes through a pressure regulator 49 which maintains the system at the predetermined desired relatively high pressure. The feed passes through line 50, through open valve 29, through line 26 and line 4, and is introduced into the bottom of zone 2 which is on the adsorption cycle. Zones 1 and 2 contain a suitable adsorbent as, for example, 4A molecular sieves or equivalent. This feed flows upwardly through zone 2 and an advancing concentration gradient of moisture on the adsorbent in the direction of flow is secured as the cycle progresses. The temperatures in zones 1 and 2 are preferably at the temperatures of the liquids being dried. Normally, these temperatures are ambient. In all instances, substantially no heat is added to or removed from the respective zones. The ambient temperature may be either at an elevated temperature or at a temperature below atmospheric. The pressure on the zone in the adsorption cycle is about atmospheric.

The dry liquid is removed from the top of zone 2 by means of line 5 and passed through check valve 7. This liquid cannot flow through line 11 due to check valve 9, which permits flow in only one direction. Dry liquid, after passing through check valve 7, or equivalent, passes through line 14, through line 16 and, preferably, through a heat exchanger 17. This dry liquid is removed from heat exchanger 17 by means of line 19, passes through control valve 20 and is removed as a product and handled in any manner desired. In accordance with the present invention, a portion of the dry liquid removed by means of line 14 passes through valve 61, through check valve 24, which is spring loaded by means of spring 23, (for reasons hereinafter described) thence through valve 22 and through a coil 18 contained within exchanger 17.

The amount of dry liquid flashed in the manners hereinbefore described may vary appreciably, but is normally below about 10% by volume, and is preferably below about 5% by volume, based upon the total dry product removed from the adsorption zone. In general, it is preferred that the amount flashed by volume, based upon the total amount of dry liquid, be in the range from about $\frac{1}{10}$% to about 1½%. The flashed vapor is removed from zone 17 by means of line 13, passed through check valve 10, through line 12 and introduced into the top of zone 1 wherein the same backwashes downwardly to substantially completely remove moisture therefrom.

When zone 1 at a relatively low pressure goes on desorption simultaneously with zone 2 going on adsorption, the first stage on the desorption cycle is to close valves 30 and 28 and to open valves 27 and 29 along with valves 45 and 44. This permits the liquid in zone 1 to be removed by means of line 31 and 43 and to be reintroduced into line 48 by means of liquid drain pump 46 through check valve 47. Under certain conditions, it may be desirable to remove this drain liquid from the system by suitable means. When the liquid has been withdrawn from zone 1, the second stage is entered into wherein a portion of the dry liquid from zone 2 is flash-vaporized as described and introduced by means of line 13, valve 10 and line 12 into the top of zone 1 wherein the same backwashes in a manner to produce a decreasing gradient of the moisture in zone 1 in the direction of the back flow or back wash. This is secured by closing valve 45 and opening valves 34 and 33, utilizing vapor vacuum pump 35. The mixture of dry gas and moisture removed from zone 1 passes through line 36, through cooler or condenser 37 and is introduced into separation zone 38. The condensed water accumulates in the bottom of separator 38 and is withdrawn from the system by means of line 41. Condensed liquid separated as an intermediate layer in separator 38 is removed by means of line 40, through valve 42 and is preferably reintroduced into the feed line 48 by means of pump 46. The operation and timing of the respective valves is secured by a pump and solenoid valve cycle timer 60 or equivalent. Uncondensed gases may be vented from the top of separator 38 by means of valve 39. This may comprise dissolved air and other non-condensible gases.

At this point, the third stage of the desorption cycle is entered into wherein valve 27 closes and valve 28 opens. This permits the refilling and repressuring of zone 1 from about 2 to 8 lbs. absolute to about atmospheric with feed liquid, which is completed simultaneously with zone 1 going on adsorption and zone 2 going on desorption. In this latter half of the cycle, feed is introduced into zone 1 through valve 28 and by means of lines 25 and 3 and liquid is permitted to drain from zone 2 through valve 30, valve 29 being closed. This liquid is removed by means of line 32 and is then handled in a manner as described with respect to the liquid withdrawn from zone 1. In the second stage of this second cycle, a portion of the dry liquid removed overhead from zone 1 by means of line 6, through check valve 8 and line 15, is bypassed through valve 61 and valve 24, and handled in a manner as described with respect to the portion of the bypass dry liquid removed from the top of zone 2. The remainder of the dry liquid removed from the top of zone 1 is passed through line 16, zone 17, line 10 and also handled as previously described with respect to zone 2. In the third stage of the second cycle, zone 2 is filled and repressured with liquid by closing valve 30 and opening valve 29 and thereafter the entire operation cyclically repeated as hereinbefore described.

A particular feature of the present invention is that spring loaded valve 24 loaded by means of spring 23 is so programmed that bypassing of a portion of the feed and flashing of the same for backwashing in the respective zones automatically occurs when the pressure in the zone undergoing desorption reaches a predetermined relatively low figure. This pressure is maintained by vacuum pump 35 or its equivalent.

As hereinbefore stated, many petroleum products and other process streams are hydrophobic liquids. That is, they are substantially immiscible with water. These liquids, however, always can dissolve at least a trace amount of water as for example in the range 50–500 weight parts per million. This small amount of water in many instances causes much difficulty. For example, water is a poison to certain catalysts and thus must be entirely removed from the feed to platinum hydroformers or acid alkylation plants. Also in low temperature processes, such as light ends distillation or butyl rubber manufacture, the feeds must be dry enough to prevent buildup of ice on cold refrigeration heat exchangers. In some products such as jet fuel, or marine gasoline, excess water can cause a haze and may be dangerous. The water haze tends to clog filters or freeze in small holes or ports causing engines to stop or burners to flame out.

Thus the present invention comprises a novel and efficient process to remove trace water from volatile and particularly hydrophobic hydrocarbon liquids. The principle used is that of heatless drying, applied to these volatile liquids. The moisture is removed from a flowing liquid by adsorption on a high capacity water selective solid desiccant. The bed is then regenerated by (1) draining out the liquid, (2) reducing the pressure of residual vapors, and (3) backpurging at low pressure with some of the dry liquid product which has been heated and flashed to vapor at the low pressure. If the actual volume of backpurging gas is greater than the actual volume of liquid feed flow per cycle, then the process can dry the liquid product completely. The gradient of moisture along the bed is moved back toward the feed end during regeneration the same distance it was moved toward the dry product end during the adsorption cycle.

When determining the desirable amount of back wash or purge it should be noted that when water vapor dissolves in hydrophobic liquids, it is compressed. Because of this compression, the moist liquid flowing into the bed on adsorption brings in more water than would the same volume of gas (or vapor) in moisture equilibrium with the liquid. The actual volume of back purge, therefore, must be greater than the liquid feed volume per cycle by at least the compression ratio factor.

Some of these compression ratio factors for water vapor dissolved in certain liquids have been found by experimental determination. These factors are listed in the following Table 1:

TABLE 1

*Water Vapor is Compressed by a Factor C When It Dissolves in Hydrophobic Liquids*

| Liquid: | Compression Factor C |
|---|---|
| Propane | 5.7 |
| Isooctane | 2.3 |
| Toluene | 27.0 |
| Jet fuel JP–4 | 4.5 |
| Powerformer feed | 4.8 |
| Methylchloride | 80.0 |

These water vapor compression ratio factors range between 2 and 40 for the usual volatile hydrocarbon fractions in a petroleum refinery. These factors are quite insensitive to temperatures below the critical temperature.

With respect to the securing of the back purge, advantage is taken of the tremendous expansion of volume that occurs when a liquid evaporates into its saturated vapor. The volume increase at constant temperature (expansion ratio) ranges from 30 to 300 times for hydrocarbon liquids as shown in Table 2 below. A small amount of heat applied to the liquid at the back purge valve will provide a large volume of gas at the same pressure as the feed. In addition, the pressure can be reduced from the feed pressure to a lower pressure for additional volume increase. In Table 2, a vacuum pump was applied to the bed being regenerated and was able to maintain 5 p.s.i.a. on the bed. The expansion ratio of the saturated vapor at feed pressure to 5 p.s.i.a. also is shown. In the last column, the overall expansion ratio is shown, from liquid volume to vapor volume at 5 p.s.i.a. at constant temperatures.

TABLE 2

*Expansion Ratios Obtainable For Purging*

| Liquid | Temp., °F. | Flashed From Liquid to Saturated Vapor | Expanded from Saturated Vapor to 5 p.s.i.a. | Overall Ratio |
|---|---|---|---|---|
| Propane | 70 | 38 | 25.0 | 900 |
| n-Butane | 70 | 108 | 6.7 | 720 |
| i-Butane | 70 | 80 | 9.1 | 730 |
|  | 90 | 58 | 13.0 | 760 |
| n-Pentane | 70 | 313 | 2.0 | 630 |
| Hexane | 212 | 99 | 7.0 | 690 |

As shown in the last column, the overall expansion ratios obtainable with a vacuum pump holding 5 p.s.i.a. on the regenerating bed ranges from 600 to 1000. The effect of temperature is small. These expansion ratios increase five times when the vacuum pump holds 1 p.s.i.a. on the regenerating bed.

The portion of dried liquid product needed for adequate regeneration can be made quite small compared to the liquid throughout. With a water vapor compression ratio of 6 in the feed (from Table 1), and an expansion ratio of 600 by flashing the product to 5 p.s.i.a. (from Table 2), $1/100$ of the dried liquid product is the minimum needed for adequate back purge. The recovery of dried liquid thus is 99% of the feed, if the purge is thrown away. If desired, the purge can be recompressed, cooled, condensed and added back to the feed after disengaging water condensate. The heat of recompression and condensation of this purge vapor can be used to flash the dry liquid being used for purge.

The hydrocarbon feed is in liquid form, compressed roughly 100 times compared to its own saturated vapor. Whereas the water vapor carried dissolved in the liquid feed is compressed roughly only 10 times. This novel process dries in liquid phase and regenerates in the vapor phase at a small fraction of the feed's vapor saturation pressure. It is, therefore, at least 10 times more effective or 10 times smaller than an all vapor phase heatless dryer of the same throughout.

A desirable desiccant for this service has a high selective capacity for water, is nonporous and drains easily, and is stable under the temperature of operation. Desirable desiccants are for example 4A molecular sieves and synthetic ion exchange resins such as Dowex 50 (X4, X10) or Amberlite 120. Tests with the preferred Dowex 50-X4 have shown it to be stable for over one year in typical hydrocarbon liquids, such as isooctane, isopropanol, toluene, jet fuel JP-4, and Powerformer feed. In other tests, Dowex 50-X4 showed no measurable adsorption of any vapors of the above liquids and other light hydrocarbon gases. Its water capacity is 50–70% of its dry weight. This is to be compared with 100–200 weight p.p.m. $H_2O$ to saturate most of hydrocarbon liquids of interest. These synthetic ion exchange resins hold 2500–7000 times more water by weight than the hydrocarbon liquids. They are preferred because of their high capacity and remarkable selectivity to adsorb water.

With regard to cycle time as much water has to be removed during regeneration as is brought in by the feed and retained on the desiccant during adsorption. This is the requirement for complete drying. The bed is long enough to eliminate channeling and the residence time of the liquid is sufficient for complete water removal. The temperature rise of the bed due to water adsorption is negligible (a few tenths of 1° C.). This is due to the high heat capacity of the carrier liquid. During regeneration, the bed temperature falls because water is being evaporated from it by the dry purge flow. At first, the heat capacity of the desiccant supplies most of this needed heat. As the bed cools, heat begins to flow in from and through the walls of the container. In large beds with low surface/volume ratio, this effect is small. In small beds with high surface/volume ratio, this heat is appreciable. This heat assists the re-evaporation of water during purge. With insulated walls of zero heat capacity (adiabatic), the bed temperature continues to fall until a steady state "wet bulb" temperature is reached. The incoming dry purge gas loses sensible heat to exactly balance the latent heat needed for the desorption.

As the temperature in the bed falls during regeneration, the vapor pressure of the adsorbed water becomes less. As the temperature falls, each volume of purge gas removes less water vapor because of its lowered vapor pressure throughout the bed. For example, from 20° C. to 9° C. the saturated vapor pressure of water halves. Over an adsorbent only partly saturated with water, the same temperature reduction also usually reduces the water vapor pressure by half. Thus, twice the purge gas volume is needed at 9° C. as at 20° C. to remove the same amount (weight) of water. As the bed temperature falls, a fixed amount of purge flow becomes less effective to remove water.

Since there is a back-moving gradient of moisture content along the bed, the amount of cooling during regeneration is a time changing function of position along the bed. In this complicated situation, most effective use of purge gas is obtained by limiting the cycle time and/or feed throughout so that the water brought in per cycle can be re-evaporated by the purge gas without lowering the bed temperature more than a few degrees. If 2, 3, 4, etc. times more actual purge gas volume than actual feed gas volume is used per cycle, the feed throughput/cycle or cycle time can be increased. In this last case, the bed temperature heats and cools many degrees. The lowest temperature is that of the "wet bulb" for the conditions. In all cases, extreme dryness of product is obtained.

In the present invention employing a technique of drying volatile hydrophobic liquids in the liquid phase, with bed regeneration accomplished by backwashing with flashed dry product at a low pressure a large volume expansion on flashing, large purge volumes are easily obtained. Thus, long cycle times and large throughputs/cycle are feasible even though they require a higher purge to feed volume ratio than 1:1. From a practical standpoint it takes time to drain liquid out of a bed before regeneration can begin. Refilling with liquid takes time. Both of these incidental steps are slower with liquids than the charge-dump steps with a gas. Thus, the bed on adsorption in the liquid phase has to have a longer duty cycle. That heatless drying with long cycles and high throughputs is feasible. For instance, a successful test with heatless drying of wet air was done using 60 minutes on adsorption cycle time. Actual back purge volume at atmospheric pressure for complete drying was found by experiment to be at least 3.8 times the actual feed volume at high pressure per cycle with 32° C. ambient.

The heatless dryer comprised two glass beds, each 57" long x ⅜" I.D. and each containing 0.00365 of silica gel impregnated with cobalt chloride as moisture indicator. Back purge at atmospheric pressure was set at 0.1 s.c.f.m. The apparatus was run at total reflux (no external product), 60 minutes on adsorption, 60 minutes on regeneration. The high pressure on the bed on adsorption was increased in steps. At each high pressure level, the moisture front could be observed advancing toward the dry product end in the bed on adsorption and receding toward the feed end in the bed on regeneration. When a high pressure of 41 p.s.i.g. (=55.7 p.s.i.a., 55.7/14.7=3.8 pressure ratio) was reached, the wet front advanced in 60 minutes through the dry bed (on adsorption) the same distance that it receded in the bed being regenerated. Since the pressure ratio was 3.8 for this condition at total reflux, the purge volume was 3.8 times the actual feed volume. This is the observed minimum purge/feed volume ratio for complete drying at 32° C. No completely dry product can be removed at this minimum working pressure ratio, 3.8. It is all needed for regeneration.

The high pressure was increased to 70 p.s.i.g. without changing the 0.1 s.c.f.m. purge rate and 0.05 s.c.f.m. dry product could be removed before slight moisture broke through at the end of the 60 minute on-adsorption time. The pressure ratio $P_Hi/P_Lo$ was 84.7/14.7=5.8. In one hour the actual feed volume was $$(0.1+0.05) \times 60/5.8 = 1.55 \text{ c.f.}$$

while the actual purge volume was $(0.1) \times 60 = 6.0$ c.f. The ratio of purge/feed volume=6.0/1.55—3.9 found in a working condition while making dry air, confirms the 3.8 minimum ratio found at total reflux above. The high feed throughput capacity/cycle was 1.55/0.00365=425 actual v./v. This compares with 15–30 actual v./v. used with one minute cycles.

At other ambient temperatures, the actual purge/feed volume ratio as a minimum for complete drying are shown in the following Table 3 for air purging at 1 atmosphere.

TABLE 3

| Ambient temperature, °C.: | Long Cycle [1] |
|---|---|
| 0 | 1.5 |
| 10 | 1.9 |
| 20 | 2.6 |
| 30 | 3.4 |
| 32 | [2]3.8 |
| 40 | 4.4 |

[1] Minimum pressure ratio for complete drying or minimum actual purge/feed volume ratio.
[2] Observed.

The ratios in Table 3 are based on the maximum depression of the wet bulb thermometer below dry bulb temperature with air at 1 atmosphere. Each number is the ratio of saturated water vapor pressure at dry bulb temperature to the vapor pressure at the lowest wet bulb (relative humidity=0%).

If the purge pressure is at 2 atmospheres the ratios are smaller, but they do not halve. The ratios are never less than 1.0. At ½ atmosphere the ratios increase, but not as much as the purge volume increases. Thus, a preferred direction to carry out regeneration for long cycle heatless drying is at sub-atmospheric pressure. The ratios can be computed for purge air at different pressures from the thermodynamic properties of water and air.

When drying (and purging) with gases other than air, knowledge of the gases' molar specific heat is useful to estimate the ratios. Table 4 shows some typical values:

TABLE 4

| Gas or vapor, 60° F.: | Molar specific heat, calories/mole, ° C. |
|---|---|
| Hydrogen | 6.8 |
| Air | 7.0 |
| Ethane | 12 |
| Propane | 21 |
| Butanes | 27 |
| Pentanes | 32 |
| Hexanes | 38 |

The maximum depression of a wet bulb thermometer in dry butane vapor at 1 atmosphere is much less (close to 7/27=0.26) than it is in dry air, because of the higher heat capacity per unit volume of butane vapor. Thus, a wet bed being purged with dry butane vapor doesn't get as cold as it does when dry air is used. The ratios shown in Table 3 for air at 1 atmosphere become very much closer to 1.0 for butane and heavier hydrocarbon vapors. This fact very much favors the use of flashed dry liquid hydrocarbon vapors for back purge in short or long cycle heatless dryers.

Finally, the empirical technique can be used. A heatless dryer is constructed of arbitrary size and cycle length. Flows, pressures, and cycles are adjusted for complete drying. Variables are then changed to the desired conditions for capacity, available pressures and desired cycle time.

Thus the present invention may be used for; drying ethylene liquid before polymerization; drying propylene liquid before polymerization; drying isobutane-butenes alkylation feed liquid to reduce acid consumption; drying isobutylene liquid for better rubber and polymer production; producing anhydrous alcohols and aromatics; and for making anhydrous liquid ammonia and other refrigerants.

As pointed out heretofore, the technique of the pressure cycling of the present invention is particularly adapted for employing as adsorbents materials heretofore not utilized as adsorbents due to the fact that when heating to desorb, these adsorbents deteriorated. In general, these adsorbents are synthetic ion exchange resins, such as Dowex 50 or 50W (X4, X10) or Amberltie 120. Dowex is manufactured by the Dow Chemical Company of Midland, Michigan, and Amberlite 120 is manufactured by Rohm & Haas, Inc., Philadelphia, Pennsylvania. In general, these polymers may comprise a polystryrene which has been cross-linked with divinyl benzene and furthere treated, such as sulfonated. Typical ion exchange resins are those described on pages 60 to 61 of the "Chemical and Engineering News" of November 30, 1959. Other typical ion exchange adsorbents which may be used in accordance with the present invention are those described on pages 76, 77, 78, 79 and 80 of "Chromatography," A Review of Principles and Applications by Edgar Lederer, Professor of Biochemistry, Sorbonne; Directeur de Recherches, Institut de Biologie Physico-Chimique, Paris; and Michael Lederer, Maitre de Recherches, Institut du Radium, Paris, Second, Completely Revised and Enlarged Edition, Elsevier Publishing Company, Amsterdam, London, New York, Princeton, 1957. Other properties of the ion exchange resins are summarized in a publication by the Dow Chemical Company, entitled "Dowex::ION Exchange," The Dow Chemical Company, Midland, Michigan, published in 1958 and 1959. Appendix B appearing on pages 71 through 75 lists the resin properties.

Thus, in general, the process of the heatless dryer is particularly adapted for adsorption of a key component from a mixture containing the same, utilizing materials as adsorbents normally not satisfactory for adsorption processes due to the fact that these materials are of the class of materials which are unstable at elevated temperatures and, therefore, deteriorate upon heating to desorb. Normal desorption temperatures are of the magnitude of 100° to 1,000° F. General desorption temperatures range from about 300° to 600° F. For example, when removing water from silica gel utilizing air, the temperature of the air is in the range from about 300° to 400° F. When removing water from molecular sieves utilizing air, the temperature of the air is in the range from about 500° to 600° F. The resins or material thus described will not withstand these temperatures and, therefore, cannot be used for removing moisture from fluid streams except in accordance with the present invention.

What is claimed is:

1. A process for the removal of water from a liquid stream comprising flowing a liquid feed stream comprising water through a first bed of a relatively dry adsorbent at a preselected initial relatively high pressure and in a positive flow direction in an initial cycle, said adsorbent, preferentially selective for said water, discharging the dry liquid stream from said first bed as a primary effluent, segregating a portion of said primary effluent as a dry product stream and withdrawing the same, passing the remainder of said primary effluent through pressure reducing means and vaporizing the same, thereafter passing said vaporized stream in reverse flow direction with respect to said positive flow direction to a second bed of adsorbent at a relatively low pressure, which adsorbent is relatively saturated with water as compared to said first bed at the start of said initial cycle, whereby said initial cycle continues, said first bed becomes relatively saturated with water progressively in said positive direction and whereby said second bed becomes progressively relatively dry in said reverse direction, continuing said cycle for a time period less than that required to secure complete saturation of said first bed and that required to secure complete dryness of said second bed, thereafter introducing said liquid feed stream into said second bed in positive flow direction at said initial relatively high pressure, discharging the dry liquid of said liquid stream from said second bed as a primary effluent, segregating a portion of said primary effluent as a dry product stream and withdrawing the same, passing the remainder of said primary effluent through pressure reducing means and vaporizing the same, then passing said vaporized stream in reverse flow through said first bed of adsorbent at said relatively low pressure, and thereafter cyclically continuing the operation.

2. Process as defined by claim 1 wherein said portion of primary effluent vaporized is passed in heat exchange with said primary effluent product prior to introducing said vaporized stream into the low pressure bed.

3. Process as defined by claim 1 wherein the desorption cycle comprises a first stage wherein liquid is withdrawn from the low pressure bed, a second stage wherein said vaporized stream backwashes through said low pressure bed and a third stage wherein the bed is repressured with liquid.

4. Process as defined by claim 1 wherein said liquid comprises petroleum hydrocarbons.

5. Process as defined by claim 1 wherein said adsorbent is an ion exchange resin.

6. A process for the removal of water from a liquid stream utilizing two adsorbent beds, said process comprising the steps of flowing a feed stream of liquid including water through a first bed of an adsorbent initially relatively freed of water at a preselected initial relatively high pressure and in a positive flow direction in an initial cycle, said adsorbent being preferentially selective for water; discharging said liquid stream from said first bed as a primary effluent; segregating a portion of said primary effluent as a product stream and withdrawing the same; passing the remainder of said primary effluent through pressure reducing means and vaporizing the same, then passing said vapor in reverse flow direction with respect to said positive flow direction through a second bed of adsorbent at a relatively low pressure, which adsorbent is relatively saturated with water as compared to said first bed at the start of said initial cycle, whereby as said initial cycle continues, said first bed becomes relatively saturated with water progressively in said positive direction, and whereby said second bed becomes relatively freed from water in said reverse direction; continuing said initial cycle for a time period less than that required to secure saturation of said first bed and that required to secure freedom from water of said second bed; thereafter introducing said liquid feed stream into said second bed in positive flow direction at said initial relatively high pressure; discharging said liquid stream from said other end of said second bed as a primary effluent; segregating a portion of said last named primary effluent as a product stream and withdrawing the same; passing the remainder of said last named primary effluent through pressure reducing means and vaporizing the same, then passing said vapor in reverse flow through said first bed of adsorbent at said relatively low pressure, and thereafter cyclically continuing the operation.

7. Process as defined by claim 6 wherein said portion of primary effluent vaporized is passed in heat exchange with said primary effluent product prior to introducing said vaporized stream into the low pressure bed.

8. Process as defined by claim 6 wherein the desorption cycle comprises a first stage wherein liquid is withdrawn from the low pressure bed, a second stage wherein said vaporized stream backwashes through said low pressure bed and a third stage wherein the bed is repressured with liquid.

9. Process as defined by claim 6 wherein said liquid comprises petroleum hydrocarbons.

10. Process as defined by claim 6 wherein said adsorbent is an ion exchange resin.

References Cited in the file of this patent

UNITED STATES PATENTS

| | | |
|---|---|---|
| 2,323,524 | Downs | July 6, 1943 |
| 2,899,474 | Ricards | Aug. 11, 1959 |
| 2,909,572 | Solomon | Oct. 20, 1959 |
| 2,944,627 | Skarstrom | July 12, 1960 |